2 Sheets--Sheet 1.
A. B. KAY.
Shot-Cartridges.
No. 148,467. Patented March 10, 1874.
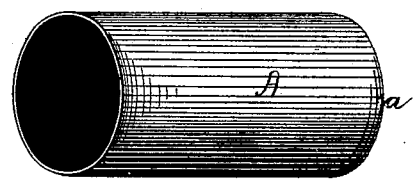
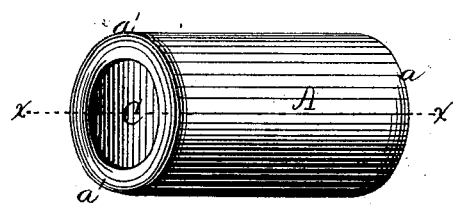
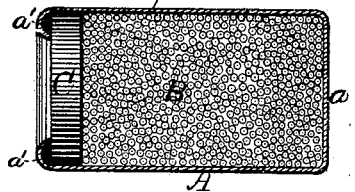
WITNESSES:
Jas. E. Hutchinson
John R. Young
INVENTOR.
Allan B. Kay, by
Prindle and Dean, his
Attorneys.

2 Sheets--Sheet 2.
A. B. KAY.
Shot-Cartridges.
No. 148,467. Patented March 10, 1874.
Fig. 4.
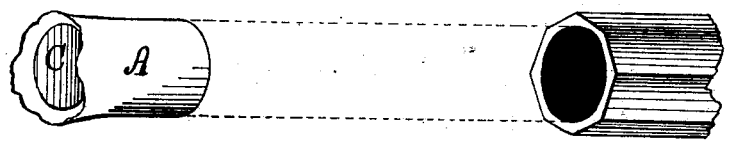
Fig. 5.
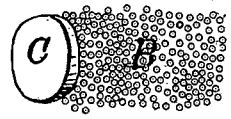
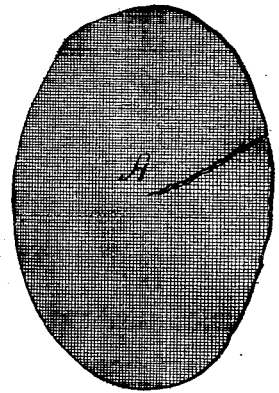
WITNESSES:
Jas. E. Hutchinson
Geo. Hazard.
INVENTOR.
Allan B. Kay, by
Prindle and Deane, his Attys